US006979962B2

(12) United States Patent
Cavarec et al.

(10) Patent No.: US 6,979,962 B2
(45) Date of Patent: Dec. 27, 2005

(54) INTERNALLY SUSPENDED MOTOR FOR POWERED WINDOW COVERING

(75) Inventors: Pierre-Emmanuel Cavarec, San Diego, CA (US); Timothy Morrison, Oceanside, CA (US); Eric W. Hauck, San Diego, CA (US)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/801,303

(22) Filed: Mar. 16, 2004

(65) Prior Publication Data

US 2005/0206334 A1 Sep. 22, 2005

(51) Int. Cl.[7] .................................................. H02K 7/00
(52) U.S. Cl. ............................................................ 318/9
(58) Field of Search ........................................ 318/9–15

(56) References Cited

U.S. PATENT DOCUMENTS 3,590,529 A * 7/1971 Purdy ............................ 49/28
3,918,201 A * 11/1975 Graziano ........................ 49/28
4,935,838 A * 6/1990 Barger et al. ............... 361/148
5,671,387 A * 9/1997 Jacobs et al. ............... 711/210
5,848,634 A 12/1998 Will ........................... 160/310
5,874,819 A * 2/1999 Hormann .................... 318/468
2003/0015301 A1 1/2003 Kilo et al. .................. 160/310

FOREIGN PATENT DOCUMENTS

DE 19736770 3/1999 ............. E06B 9/68

* cited by examiner

*Primary Examiner*—Bentsu Ro
(74) *Attorney, Agent, or Firm*—John L. Rogitz

(57) ABSTRACT

A metal or plastic tube is formed with slots to establish a noise dampening coupling to isolate the head rail of a window covering from vibrations from a motor in the head rail. The noise dampening coupling can be coupled to the output gear of the motor and to an actuator in the head rail to couple the motor to the actuator while isolating the head rail from vibrations. Also, a non-rotatable noise dampening coupling can be interposed between the motor and head rail to further isolate the head rail from vibrations.

21 Claims, 4 Drawing Sheets

INTERNALLY SUSPENDED MOTOR FOR POWERED WINDOW COVERING

FIELD OF THE INVENTION

The present invention relates generally to motorized window coverings.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering.

As recognized herein, it is desirable to minimize the noise emitted by such systems during operations. As further recognized herein, most of the noise is due to vibrations of the head rail caused by vibrations of the motor within the head rail.

SUMMARY OF THE INVENTION

A powered assembly includes an object such as a window covering that can be moved between an open configuration and a closed configuration, and a preferably battery-powered motor that is coupled, through a gear train, to an actuator to move the object when the motor is energized. The motor may be powered from the AC electrical grid for applications requiring more power. At least one noise dampening coupling is either interposed between the gear train and the actuator to couple rotational motion of the gear train to the actuator, or is disposed between the motor and a stationary head rail mount to couple the motor to the mount.

The noise dampening coupling can be a metal or plastic cylinder that has slots formed in it such that it is flexible about its longitudinal axis but is substantially resistant to twisting under the influence of torque about its longitudinal axis.

The noise dampening coupling can be a rotatable noise dampening coupling that couples the gear train to an actuator adaptor, and the assembly can also include at least one non-rotatable noise dampening coupling that couples the motor to a head rail mount. The non-rotatable noise dampening coupling may surround the rotatable noise dampening coupling, or the motor may be interposed between the non-rotatable noise dampening coupling and the rotatable noise dampening coupling. Furthermore, a secondary rotatable noise dampening coupling can be interposed between the rotatable noise dampening coupling and the actuator, with the rotatable noise dampening couplings rotating together.

In one preferred non-limiting embodiment, a metal tube can be positioned within the head rail and surround the motor and gear train but not the secondary rotatable noise dampening coupling. In this embodiment, a secondary non-rotatable noise dampening coupling can be interposed between the head rail mount and motor.

In another aspect, a drive assembly for a window covering that includes an actuator in a head rail includes an electrically-powered drive structure couplable to the actuator to move the window covering when the drive structure is energized. At least one noise dampening coupling is engaged with the drive structure and couplable either to the actuator to couple the drive structure to the actuator while suppressing transmission of vibrations from the drive structure to the head rail, and/or to a head rail mount to engage the drive structure with the head rail.

In still another aspect, a drive assembly for a window covering that includes an actuator in a head rail includes an electrically-powered drive structure couplable to the actuator to move the window covering when the drive structure is energized. Means couple the drive structure to the actuator and/or to the head rail while suppressing transmission of vibrations from the drive structure to the head rail.

The details of the present invention, both as to its construction and operation, can best be understood in reference to the accompanying drawings, in which like numerals refer to like parts, and which:

DETAILED DESCRIPTION OF THE PREFERRED EMBODIMENT

Figure 1:
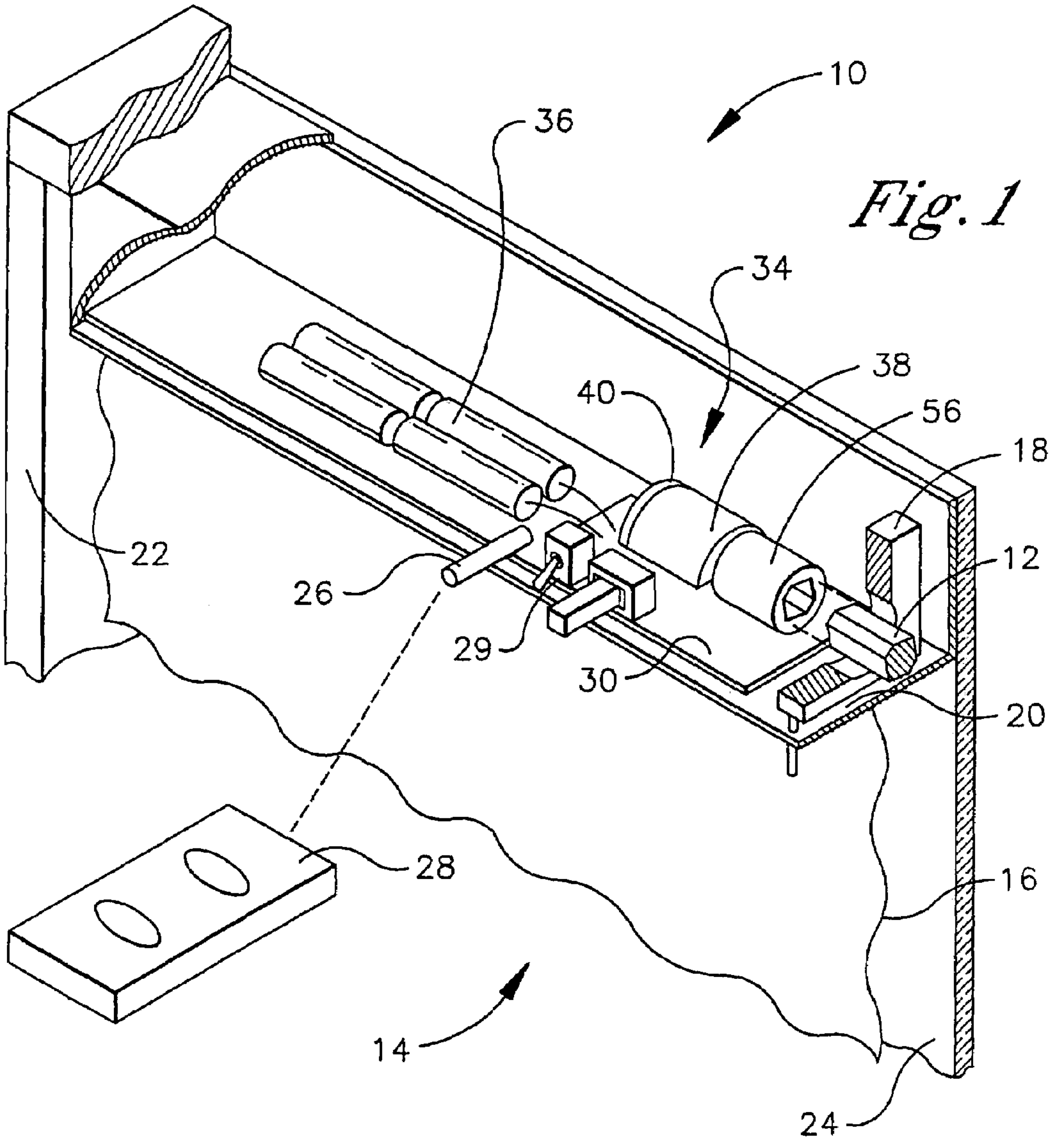
FIG. 1 is a perspective view of a window covering actuator, shown in one intended environment, with portions of the head rail cut away.

Referring initially to FIG. 1, a motorized window covering is shown, generally designated 10, that includes an actuator 12 such as a rotatable tilt rod or tube wheel of a window covering 14, such as but not limited to a shade assembly having raisable (by rolling up) and lowerable (by rolling down, or unrolling) shade 16. As shown, the actuator 12 is rotatably mounted by means of a block 18 in an upper hollow enclosure of the window covering 14, such as but not limited to head rail 20.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names “Silhouette”, “Shangri-La”, etc. as well as to projector screens, security screens, awnings, roller doors, etc. that can be raised and lowered from an upper enclosed hollow chamber. Moreover, the invention may also apply to tilting slat systems such as in horizontal blinds. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals.

FIG. 1 also shows that a noise-dampened motor and gear train assembly, generally designated 34, is provided in the head rail 20 for holding a preferably small, lightweight AC or DC electric motor that is coupled to a gear train as set forth more fully below. The noise-dampened motor and gear train assembly 34 is engaged with the actuator 12, so that when the below-described motor is energized, the actuator 12 rotates. The assembly 34 may be mounted on the circuit board 30 or other suitable location in the head rail. The assembly 34 may be thought of as establishing a mechanical subset.

It is to be understood that the below-described motor within the noise-dampened motor and gear train assembly 34 is electrically connected to the circuit board 30. To power the motor, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor is closed to energize the motor and move the window covering open or closed in accordance with the signal generated by the signal generator 28, under control of the processor on the electronic circuit board 30.

Figure 2:
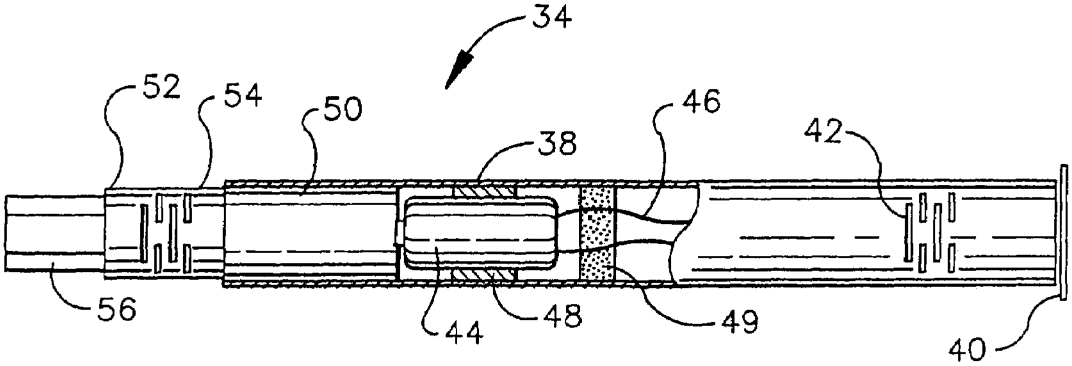
FIG. 2 is a side view of a first embodiment of the internally suspended motor, with portions of the stationary tube that establishes one version of the non-rotatable noise dampening coupling cut away for clarity.

Now referring to a non-limiting illustrative embodiment in FIG. 2, one preferred non-limiting embodiment of the assembly 34 can be seen. As shown, a hollow plastic or metal tube 38 is fixedly attached at an end thereof to a stanchion or mount 40, it being understood that the mount 40 is affixed to the inside of the head rail 20 shown in FIG. 1. The tube 38 is formed with plural slots 42 to establish a non-rotatable noise dampening coupling in accordance with principles further elucidated below.

As shown in FIG. 2, a preferably twelve volt direct current motor 44 is held within the tube 38. It is to be understood that the motor 44 is electrically connected to the batteries 36 shown in FIG. 1 by, e.g., electrical lines 46 or, for larger applications, to the electrical grid. A soft neoprene or other sound-dampening or shock-absorbing sound mount 48 is sandwiched between the motor 44 and tube 38 to hold the motor housing stationary within the tube. Also, a sound plug 49 may be tightly disposed in the tube 38 between the motor 44 and the end of the tube 38 that is affixed to the head rail 20 as shown.

FIG. 2 also shows that a reduction gear train housing 50 is within the tube 38. The reduction gear train housing 50 holds reduction gears that are coupled to the motor 44 and that have an output gear (not shown) which owing to the gearing provided by the gear train, rotates at a slower speed than the rotor of the motor 44.

In accordance with the present invention, a rotatable noise dampening coupling 52 is affixed as by keying, gluing, or other method to the output gear of the gear train contained within the gear train housing 50. Consequently, the rotatable noise dampening coupling 52 rotates with the output gear. In the exemplary non-limiting embodiment shown, the rotatable noise dampening coupling 52 is a hollow cylindrical piece of plastic or metal that is formed with plural slots 54 to absorb vibration from the motor 44 in accordance with principles below.

Affixed to the rotatable noise dampening coupling 52 is an adaptor 56 that is configured for engaging the actuator 12 shown in FIG. 1, so that rotational motion of the rotor of the motor 44 is reduced by the gear train and transferred through the rotatable noise dampening coupling 52 and adaptor 56 to the actuator 12. The adaptor 56 may receive the actuator 12 therein as shown in FIG. 1, in which case the interior channel of the adaptor 56 is shaped complementarily to the contour of the actuator 12, or the adaptor 56 may be received within the actuator 12 when the actuator 12 is, e.g., a rotatable tube of a roll-up shade. Or, the adaptor 56 may be engaged in any other suitable way with the actuator 12.

As can be appreciated in reference to FIG. 2, the motor 44, gear train, coupling 52, and actuator 12 can be oriented coaxially with each other, and the axis is horizontal when the actuator 10 is installed as intended. It can be further appreciated that the weight of the mechanical subset established at least in part by the motor and gear train can be at least partially shared between two noise dampening couplings, i.e., between two elastic coupling devices.

Figure 3:
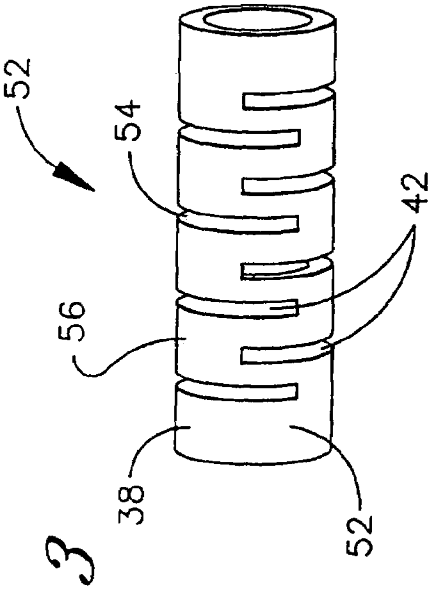
FIG. 3 is an isometric view of one preferred non-limiting noise coupling.

Details of one embodiment of the rotatable noise dampening coupling 52 may be seen in FIG. 3, it being understood that the same principles apply to the non-rotatable noise dampening coupling established by the slots 42 in the tube 38. It may be appreciated in reference to FIG. 3 that the coupling 52 may be a rigid hard plastic cylinder in which the slots 54 have been formed during molding, or subsequently, by cutting or machining the slots 54 in the coupling 52. Each slot 54 extends completely through the wall of the cylindrical body of the coupling 52, i.e., from the outer surface of the coupling through the inner surface as shown. Also, the slots are oriented perpendicularly to the axis of the coupling as shown.

Two slots 54 preferably are formed at the same axial location of the coupling, radially opposite each other, with each slot of a pair extending around the circumference of the coupling about 150 degrees. Consequently, the slots 54 in a pair are separated by a pair of lands 56 as can be appreciated in the isometric view of FIG. 3, with the lands 56 that are associated with a single pair of slots 54, like the slots themselves, being opposed to each other by 180 degrees. Furthermore, in the embodiment shown in FIG. 3 successive pairs of slots 54 (and, hence, each successive pair of associated lands 56) preferably are radially staggered from each other by 90 degrees. With this structure, the noise dampening coupling of the present invention is somewhat flexible about its longitudinal axis but is substantially resistant to twisting under the influence of torque about its longitudinal axis. Importantly, the present noise dampening coupling absorbs vibrations, to minimize transmission of vibrations from the motor 44 to the head rail 20 and, hence, to reduce the noise that emanates from the system during operation. The present coupling can be considered to be an elastic coupling device.

Figure 4:
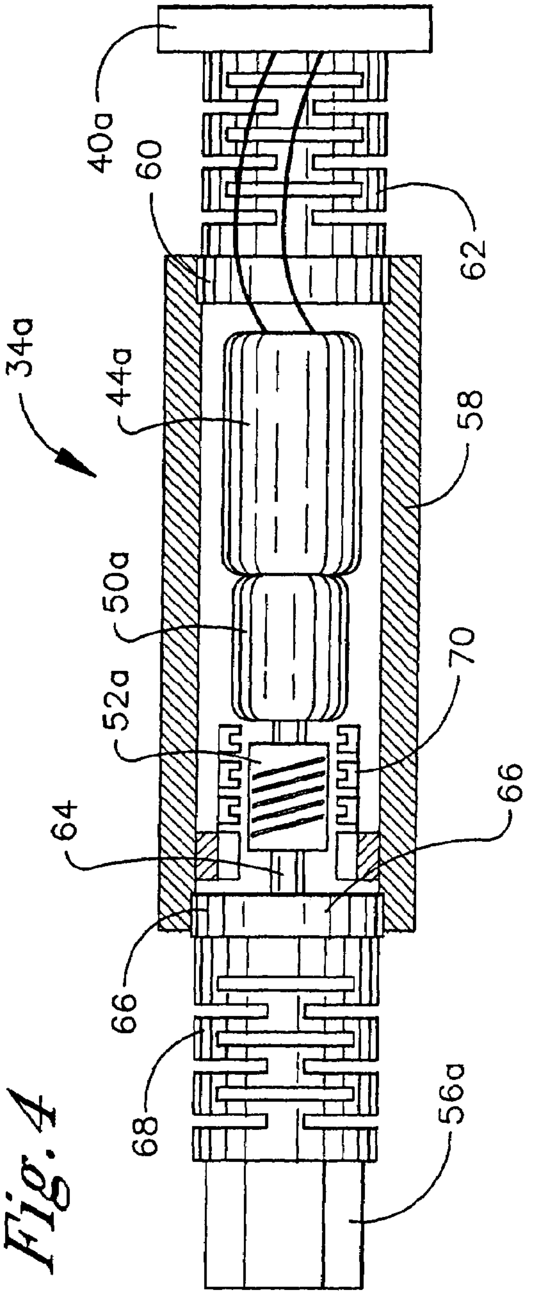
FIG. 4 is a side view of a second embodiment of the internally suspended motor sans the head rail, with the sides of the steel tube and the first non-rotatable noise dampening coupling removed for clarity.

FIG. 4 shows another embodiment of the noise-dampened motor and gear train assembly, generally designated 34*a*, which provides two pair of noise dampening couplings instead of the single pair shown in FIG. 2. As shown, the noise-dampened motor and gear train assembly 34*a* in FIG. 4 includes a motor 44*a* coupled to a gear train in a housing 50*a*, with the output gear being coupled to a rotatable noise dampening coupling 52*a*. The components 34*a*, 44*a*, 50*a*, 52*a* thus far described in FIG. 4 are in all essential respects identical to the corresponding components 34, 44, 50, 52 described in FIG. 2, with the exception that the rotatable noise dampening coupling 52*a* shown in FIG. 4 has a single spiral-shaped slot extending continuously around the circumference of the coupling from near one end of the coupling 52*a* to near the opposite end of the coupling 52*a* for multiple turns as shown. Like the noise dampening coupling shown in FIG. 3, the noise dampening coupling 52*a* shown in FIG. 4 is somewhat flexible about its longitudinal axis but is substantially resistant to twisting under the influence of torque about its longitudinal axis.

In contrast to the noise-dampened motor and gear train assembly 34 shown in FIG. 2, in the assembly 34*a* shown in FIG. 4 the motor 44*a*, gear train housing 50*a*, and rotatable noise dampening coupling 52*a* are disposed in a relatively heavy, preferably metal steel or Iron tube 58 to further reduce the sound of operation of the system. One end of the tube 58 is blocked (except for electrical leads) by a sound plug 60, with a first non-rotatable noise dampening coupling 62 being affixed to the end of the tube 58. Also, the first non-rotatable noise dampening coupling 62 is affixed to a mount 40*a* that in turn is affixable to the inside of the head rail 20 shown in FIG. 1.

In any case, the displacement of the mechanical subset is limited by special parts (e.g., the heavy tube 58) or by the exterior tube/head rail, which prevents any damage due to shocks or large movements during installation.

In further contrast to the noise-dampened motor and gear train assembly 34 shown in FIG. 2, in the assembly 34*a* shown in FIG. 4 the rotatable noise dampening coupling 52*a* is a first rotatable noise dampening coupling, and it is attached, by a shaft 64 that extends through a bearing 66, to a second rotatable noise dampening coupling 68. The bearing 66 fits inside the end of the tube 58 that is opposite the mount 40*a*. The second rotatable noise dampening coupling 68 may be configured substantially identically to the rotatable noise dampening coupling 52 shown in FIG. 2 as shown, although it is to be understood that it may have a spiral-shaped groove like the first rotatable coupling 52*a* shown in FIG. 4 if desired. In any case, the second rotatable noise dampening coupling 68 is engaged with an adapter 56*a* that is in all essential respects identical to the adapter 56 shown in FIG. 2.

In accordance with the embodiment shown in FIG. 4, the non-rotatable noise dampening coupling 62 is a first non-rotatable noise dampening coupling, and a second non-rotatable noise dampening coupling 70 surrounds the first rotatable noise dampening coupling 52*a* and is in an abutting relationship with the bearing 66. Accordingly, the first rotatable noise dampening coupling 52*a* rotates within the second noise dampening coupling 70 when the motor 44*a* is energized. The second noise dampening coupling 70 may be configured with a single spiral slot or plural slots as shown in the coupling depicted in FIG. 3.

Figure 5:
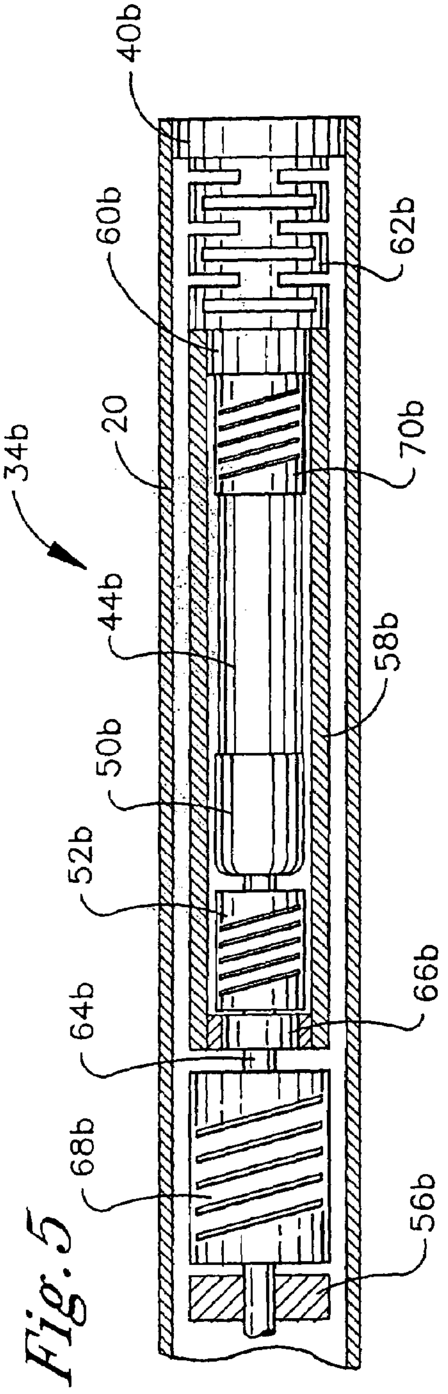
FIG. 5 is a side view of a third embodiment of the internally suspended motor, including a depiction of the head rail, with the sides of the steel tube and the head rail removed for clarity.

FIG. 5 shows yet a third embodiment of the noise-dampened motor and gear train assembly, generally designated 34*b*, which, like the assembly 34*a* shown in FIG. 4, provides two pair of noise dampening couplings instead of the single pair shown in FIG. 2. As shown, the noise-dampened motor and gear train assembly 34*b* in FIG. 5 includes a motor 44*b* coupled to a gear train in a housing 50*b*, with the output gear being coupled to a rotatable noise dampening coupling 52*b*. The components 34*b*, 44*b*, 50*b*, 52*b* thus far described in FIG. 5 are in all essential respects identical to the corresponding components 34, 44, 50, 52 described in FIG. 2, with the exception that the rotatable noise dampening coupling 52*b* shown in FIG. 5 can have a single spiral-shaped slot as shown.

Also like the assembly 34*a* shown in FIG. 4, in the assembly 34*b* in FIG. 5 the motor 44*b*, gear train housing 50*b*, and rotatable noise dampening coupling 52*b* are disposed in a relatively heavy, preferably steel or Iron tube 58*b* that has one end blocked (except for electrical leads) by a sound plug 60*b* and that has a first non-rotatable noise dampening coupling 62*b* affixed to this end of the tube 58*b*. Also, the first non-rotatable noise dampening coupling 62*b* is affixed to a mount 40*b* that in turn is affixable to the inside of the head rail 20 shown in FIG. 1. Moreover, in the assembly 34*b* shown in FIG. 5 the rotatable noise dampening coupling 52*b* is a first rotatable noise dampening coupling, and it is attached, by a shaft 64*b* that extends through a bearing 66*b* to a second rotatable noise dampening coupling 68*b*. The second rotatable noise dampening coupling 68*b* is engaged with an adapter 56*b* that is in all essential respects identical to the adapter 56 shown in FIG. 2.

Thus far, the assembly 34*b* shown in FIG. 5 is substantially identical to that shown in FIG. 4. Furthermore, while the non-rotatable noise dampening coupling 62*b* is a first non-rotatable noise dampening coupling, a second non-rotatable noise dampening coupling 70*b* is disposed in the heavy tube 58*b* between the motor 44*b* and the first non-rotatable noise dampening coupling 62*b* that is outside the heavy tube 58*b* and that is attached to one end thereof. Accordingly, the first non-rotatable noise dampening coupling 62*b* attaches the heavy tube 58*b* to the mount 40*b* of the head rail 20, while the second non-rotatable noise dampening coupling 70*b* attaches the motor 44*b* to the sound plug 60*b* within the heavy tube 58*b*, providing yet further sound isolation of the motor 44*b*.

Figure 6:
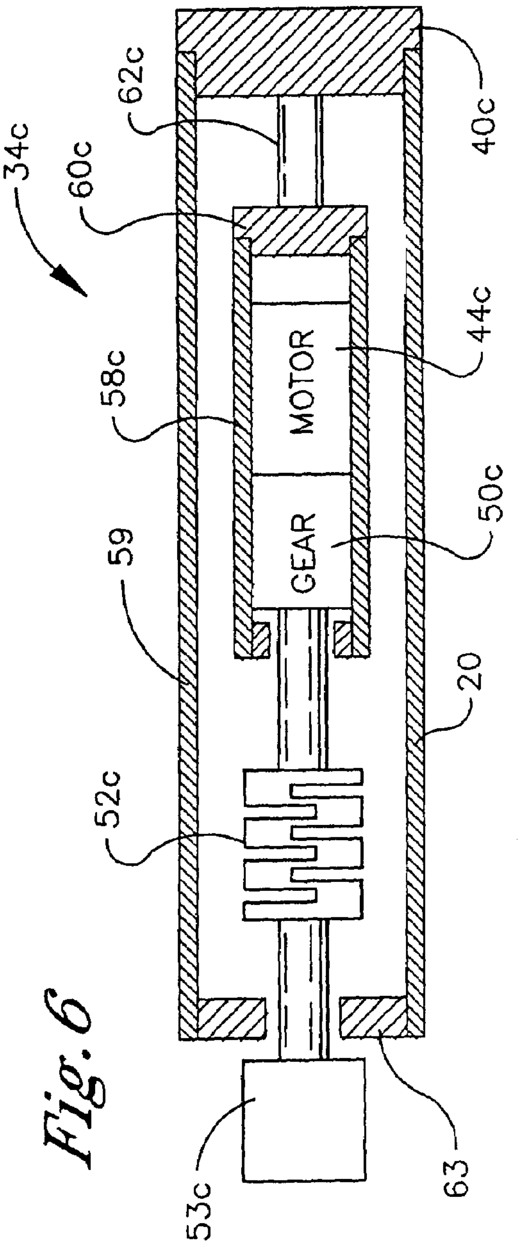
FIG. 6 is a side view of a fourth embodiment of the internally suspended motor.

FIG. 6 shows yet a fourth embodiment of the noise-dampened motor and gear train assembly, generally designated 34*c*, which provides a single pair of noise dampening couplings. As shown, the noise-dampened motor and gear train assembly 34*c* in FIG. 6 includes a motor 44*c* coupled to a gear train in a housing 50*c*, with the output gear being coupled to a rotatable noise dampening coupling 52*c*. In turn, the coupling 52*c* is coupled to an output rod or tube wheel or output shaft 53*c*. The components 34*c*, 44*c*, 50*c*,

52*c* thus far described in FIG. 6 are in all essential respects identical to the corresponding components 34, 44, 50, 52 described in FIG. 2.

Also, in the assembly 34*c* in FIG. 6 the motor 44*c* and gear train housing 50*c* (but not the rotatable noise dampening coupling 52*c*) are disposed in a preferably steel or Iron tube 58*c* that has one end blocked (except for electrical leads) by a sound plug 60*c* and that has a first non-rotatable noise dampening coupling 62*c* affixed to this end of the tube 58*c*. Also, the first non-rotatable noise dampening coupling 62*c* is affixed to a stationary mount 40*c* that in turn is fixed to the inside of an external tubular envelope 59 of, e.g., a component having such an envelope.

In one non-limiting embodiment the tubular envelope 59 may be cylindrical to obtain high stiffness properties, and it may be made of steel or Iron with a wall thickness of 1 mm to 2 mm. If desired, a bearing 63 may be connected between the output shaft 53*c* and the tubular envelope 59.

The power-drive device depicted in FIG. 6 is then protected by its external envelope 59. It will be appreciated that this envelope 59 establishes a natural boundary for the displacement of the suspended mechanical subset in case of shocks during transportation or installation. That is, an advantage of an external tubular envelope 59 in FIG. 6 is that a tube, and even more a cylinder, has intrinsically a high rigidity. The mechanical subset including the motor and gear train is suspended inside this tube which acts as a high rigidity supporting member and which is very stable, thereby preventing coupling the resonant frequencies which would otherwise reduce the efficiency of the elastic couplings when the supporting member itself does not have a sufficient mass and/or rigidity.

In addition, in some non-limiting embodiments significant advantages may be realized when the assembly includes a rotatable tube, upon which is rolled a screen, an awning or even a roller shutter.

Figure 7:
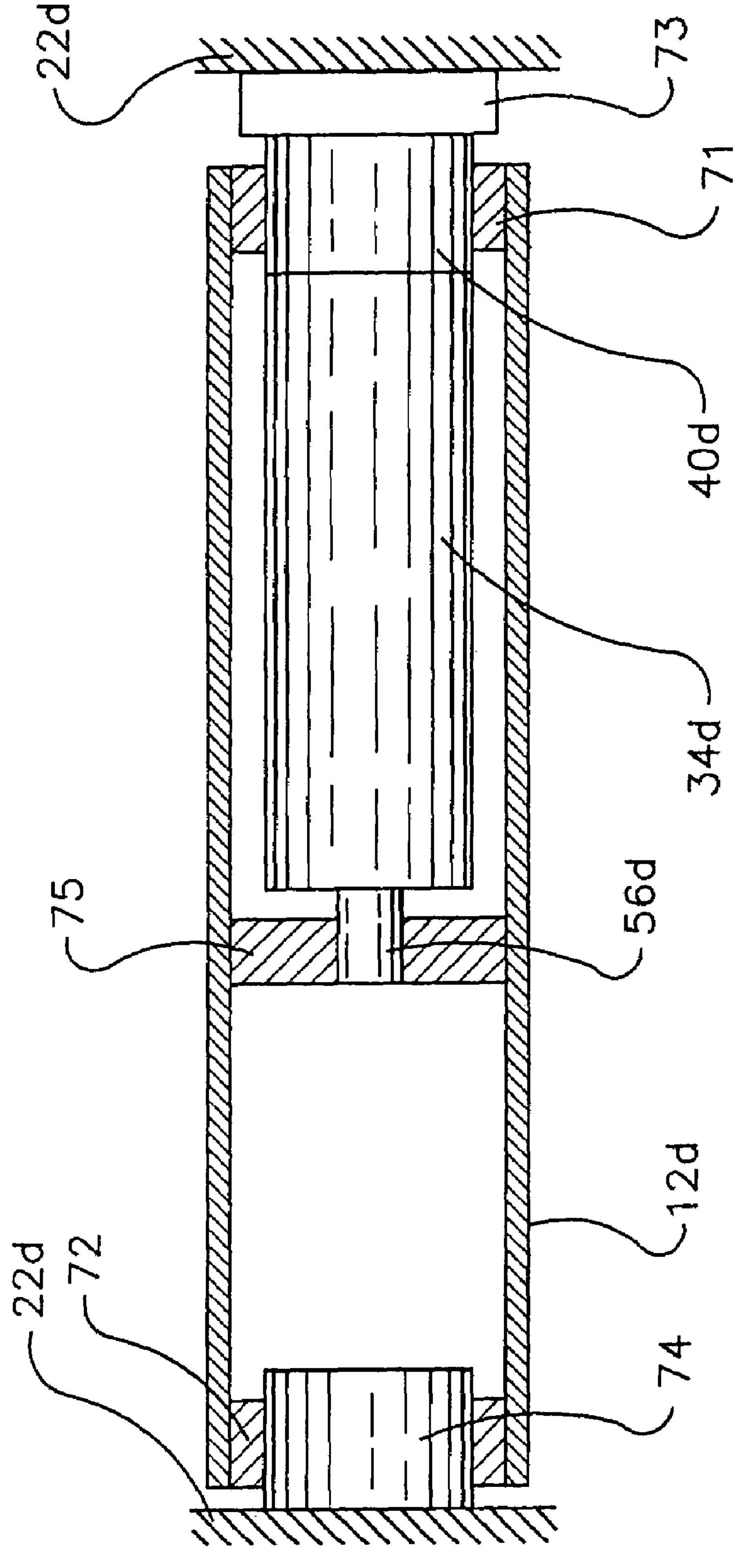
FIG. 7 is a side view of the system embodied in a screen.

More specifically, in reference to FIG. 7, a noise-dampened motor and gear train assembly, generally designated 34*d*, is disposed within a rotatable tube 12*d*. It is to be understood that the assembly 34*d* includes a motor and gear train assembly that is suspended inside the housing of the assembly 34*d* by one or more of the above-described couplings, e.g., the assembly 34*d* with motor head or mount 40*d* could be established by the assembly 34*c*/element 40*c* shown in FIG. 6, or by the assembly 34 with element 40 shown in FIG. 1.

The rotatable tube 12*d* extends between opposing side walls of a window frame 22*d* as shown. The tube 12*d* may be mounted to the window frame 22*d* by connecting the stationary mount (or equivalently, motor head end) 40*d* to a first support 73, with the first support in turn being affixed to the window frame 22*d* near the top of the window frame. Alternatively if desired, the bearing 71 can be directly mounted between the rotatable tube 12*d* and the first support 73 but it is usually preferred to implement this bearing function as part of the power-drive device 34*d*. Also, a second support 74 is disposed within the tube 12*d* and is affixed to the window frame 22*d*, opposite the first support 73. The mount 40*d* is surrounded by a first bearing 71 which rotates with the tube 12*d*, while the second support 74 is surrounded by a second bearing 72 that also rotates with the tube 12*d*. The bearings 71, 72 ride on the mount/support 40*d*, 74, respectively as the tube 12*d* turns.

As mentioned above, the assembly 34*d* includes a suspended (by one or more of the present couplings) motor and gear train assembly having an output shaft in accordance with previous disclosure, and an adapter 56*d* that in all essential respects can be identical to the adapter 56 shown in FIG. 2 is engaged with the output shaft of the assembly 34*d*. A wheel 75 is engaged with the adaptor 56*d*. In accordance with the embodiment of FIG. 7, the wheel 75 is also engaged with the rotatable tube 12*d*, so that the tube 12*d* rotates when the assembly 34*d* is energized.

In the embodiment shown in FIG. 7, the bearings 71, 72 and the wheel 75 preferably are made of hard materials. Absent suspending the motor and gear train within the assembly 34*d* as contemplated herein, undamped solid-borne vibrations could otherwise propagate from the motor of the assembly 34*d* towards the rotatable tube 12*d*, which in turn would undesirably radiate the vibrations. Previous solutions to this noise problem included the use of soft materials for the bearings 71, 72 and wheel 75, or even for the supports 73, 74, but as understood herein the use of soft materials is less than optimum because these parts must bear the whole weight of the window covering, and elasticity must be maintained quite low. A non-limiting advantage of the invention of FIG. 7 is that only the mechanical subset including the motor and gear has to be suspended by elastic parts. Then, the stiffness of the elastic couplings can be much lower and the efficiency of the dampening is dramatically improved.

While the particular INTERNALLY SUSPENDED MOTOR FOR POWERED WINDOW COVERING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An electrical power-drive device including at least one motor and at least one gear comprising:

an output shaft connectable to at least one of: a rotatable tube, and a rod;

at least one stationary mount;

wherein a mechanical subset including the motor and gear is elastically coupled by at least a first elastic coupling means and a second elastic coupling means to the output shaft and to the stationary mount.

2. The device of claim 1, wherein the motor, gear, tube and/or rod are aligned on the same axis, the axis being oriented horizontally.

3. The device of claim 2, wherein the weight of the mechanical subset is at least partially shared between the first and second elastic coupling means.

4. The device of claim 1, wherein the mechanical subset is disposed in a tubular envelope engaged with the stationary mount on a first side of the subset and with a bearing guiding the output shaft on a second side of the subset.

5. The device of claim 4, wherein the tubular envelope is cylindrical.

6. The device of claim 1, wherein at least one of the first elastic coupling means and second elastic coupling means is flexible about its longitudinal axis but is substantially resistant to twisting under the influence of torque about its longitudinal axis.

7. The device of claim 1, wherein at least one of the first elastic coupling means and second elastic coupling means is made of at least one of: metal, and plastic, and is cylindrically-shaped and has formed therein at least one of: (a) plural slots oriented perpendicularly to a long axis of the coupling means, at least two slots being axially spaced from each other and being radially staggered from each other with neither extending completely around the circumference of the coupling means, and (b) one spiral-shaped slot extending completely around the circumference of the coupling means for multiple turns.

8. The device of claim 1, further comprising:

a rotatable component selected from the group consisting of a rotatable tube and a rotatable rod, the rotatable component being coupled to the output shaft; and at least one object that can be moved by the tube or rod between an open configuration and a closed configuration, wherein the object is selected from the group including solar screens, projection screens, awnings, and roller shutters.

9. A powered assembly, comprising:

at least one object that can be moved between an open configuration and a closed configuration;

at least one motor;

at least one actuator coupled to the motor and the object to move the object when the motor is energized;

at least one gear train coupled to the motor; and at least one noise dampening coupling disposed in one of: a location between the gear train and the actuator to couple rotational motion of the gear train to the actuator, and between the motor and a stationary mount to couple the motor to the mount.

10. The powered assembly of claim 9, wherein the motor is powered by at least one dc battery.

11. The powered assembly of claim 10, wherein the object is a window covering.

12. The powered assembly of claim 11, wherein the noise dampening coupling is made of at least one of: metal, and plastic, the noise dampening coupling being cylindrically-shaped and having formed therein at least one of: (a) plural slots oriented perpendicularly to a long axis of the coupling, at least two slots being axially spaced from each other and being radially staggered from each other with neither extending completely around the circumference of the coupling, and (b) one spiral-shaped slot extending completely around the circumference of the coupling for multiple turns.

13. The powered assembly of claim 12, wherein the noise dampening coupling is flexible about its longitudinal axis but is substantially resistant to twisting under the influence of torque about its longitudinal axis.

14. The powered assembly of claim 9, further comprising at least one tube holding the motor and at least one sound mount interposed between the motor and tube.

15. The powered assembly of claim 4, further comprising at least one tube holding the motor and defining an end and at least one sound plug interposed between the motor and the end of the tube.

16. The powered assembly of claim 9, wherein the noise dampening coupling is a rotatable noise dampening coupling interposed between the gear train and the actuator to couple rotational motion of the gear train to the actuator, and the assembly further comprises:

at least one non-rotatable noise dampening coupling disposed between the motor and a stationary mount to couple the motor to the mount.

17. The powered assembly of claim 16, wherein the non-rotatable noise dampening coupling is flexible about its longitudinal axis but is substantially resistant to twisting under the influence of torque about its longitudinal axis.

18. The powered assembly of claim 16, further comprising a secondary rotatable noise dampening coupling interposed between the rotatable noise dampening coupling and the actuator, the rotatable noise dampening couplings rotating together.

19. The powered assembly of claim 18, wherein the object is a window covering including a head rail, and the assembly further comprises a metal tube within the head rail and surrounding at least the motor and gear train but not the secondary rotatable noise dampening coupling, a secondary non-rotatable noise dampening coupling being interposed between the motor and the mount.

20. The powered assembly of claim 16, wherein the non-rotatable noise dampening coupling surrounds the rotatable noise dampening coupling.

21. The powered assembly of claim 16, wherein the motor is interposed between the non-rotatable noise dampening coupling and the rotatable noise dampening coupling.

* * * * *